United States Patent [19]

By

[11] Patent Number: 5,037,272

[45] Date of Patent: Aug. 6, 1991

[54] TORQUE CONVERTER TURBINE

[75] Inventor: Robert R. By, New Baltimore, Mich.

[73] Assignee: General Motors Corporation, Detroit, Mich.

[21] Appl. No.: 509,123

[22] Filed: Apr. 16, 1990

Related U.S. Application Data

[63] Continuation-in-part of Ser. No. 456,875, Dec. 26, 1989, abandoned.

[51] Int. Cl.$^5$ .............................................. F01D 5/04
[52] U.S. Cl. .................................. 416/180; 416/197 C
[58] Field of Search ............... 416/180, 197 R, 197 C, 416/DIG. 2; 60/330; 29/889.5; 264/221, DIG. 44

[56] References Cited

U.S. PATENT DOCUMENTS 2,481,541 9/1949 Schneider ......................... 416/180

FOREIGN PATENT DOCUMENTS 846455 8/1960 United Kingdom ................. 416/180
1440134 6/1976 United Kingdom ................. 416/180

Primary Examiner—Edward K. Look
Assistant Examiner—James A. Larson
Attorney, Agent, or Firm—Donald F. Scherer

[57] ABSTRACT

A torque converter turbine has a plurality of blades integrally molded or cast with a shell or core to form a substantially semi-toroidal structure. Each blade has a rounded leading edge and trailing edge joined by hydrofoil blade surfaces. The flow space between adjacent blades provides the optimum distributed flow area from the leading edge to the trailing edge.

3 Claims, 2 Drawing Sheets

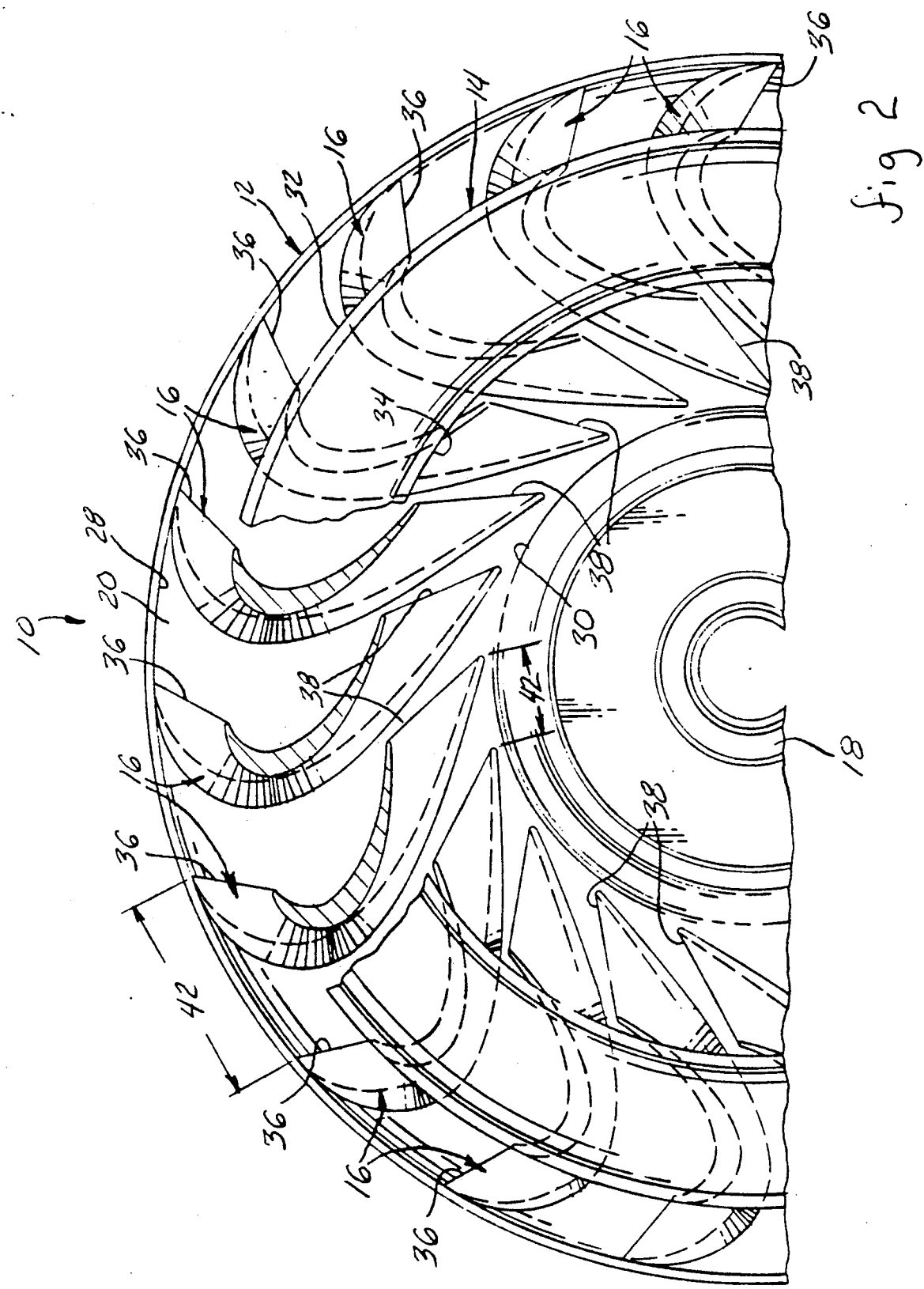

TORQUE CONVERTER TURBINE

This is a continuation-in-part application of U.S. Ser. No. 07/456,875, filed Dec. 26, 1989, now abandoned.

BACKGROUND OF THE INVENTION

This invention relates to torque converter turbines, and more particularly, to such turbines having molded hydrofoil blades.

Thin sheet metal bladed turbines provide a substantially diverging-converging flow area from the inlet of the turbine to the exit. Prior art hydrofoil blade shapes have achieved better flow area distribution but have a significantly reduced converter capacity. Thus, the industry has, for the most part, continued to use thin sheet metal blades in torque converters and impellers while using cast hydrofoil shapes in the stator. Another reason was that they did not have a manufacturing process inexpensive enough for the automotive applications. Now we have the "lost-core" plastic molded process.

The bladed turbine is sensitive to the direction of flow at the inlet. As is well known, the angle of inlet flow relative to the leading edge of the turbine blade varies with the speed ratio between the turbine and the impeller. The hydrofoil blade with round leading edge is less sensitive to the flow direction entering the turbine. Therefore, the hydrofoil turbine has less incidence loss than the sheet metal turbine. However, the improved capacity and the reduced manufacturing cost in thin sheet metal bladed devices outweigh the disadvantage which accompanies the round hydrofoil leading edge. In other words, the thin sheet metal bladed turbines have been found to be as effective as the cast hydrofoil bladed turbines in the prior art.

SUMMARY OF THE INVENTION

The present invention provides a torque converter turbine having integrally molded or cast hydrofoil shaped blades which provide the same converter capacity as a thin bladed turbine of equal size by establishing the optimum flow area distribution through the turbine with the minimum area being the same as the minimum area of a comparable sheet metal bladed turbine.

The present invention contemplates an integrally molded torque converter turbine wherein the outer shell, core and blade members are molded as a single member with the blade members having a smooth rounded leading and trailing edge extending between the shell and core member. Turbines incorporating the present invention have an additional advantage over thin metal bladed turbines in that the molded turbine blade is significantly less sensitive to the changing direction of fluid flow at the entrance to the bladed area throughout the speed ratio range of the torque converter. Thus, in torque converters of comparable capacity, the molded turbine blade of the present invention provides for improved efficiency throughout the speed ratio range of a torque converter.

It is therefore an object of this invention to provide an improved turbine for a torque converter wherein an integrally molded structure has turbine blades having a hydrofoil shape.

It is another object of this invention to provide an improved torque converter turbine as set forth in the preceding object, wherein each blade has a rounded leading edge with a radius in the range of 1.50 to 2.50 mm and the optimum flow area distribution between adjacent blades from the inlet thereof to the outlet.

It is a further object of this invention to provide an improved molded torque converter turbine as set forth in the preceding objects, and further wherein, each hydrofoil blade has a maximum thickness in the range of 4 to 10 mm and a trailing edge having a radius of curvature in the range of 0.40 to 0.60 mm.

These and other objects and advantages of the present invention will be more readily apparent from the following description and drawings.

DESCRIPTION OF THE DRAWINGS

FIG. 2 is a view partly in section taken along lines 2—2 of FIG. 1.

DESCRIPTION OF THE PREFERRED EMBODIMENT

Figure 1:
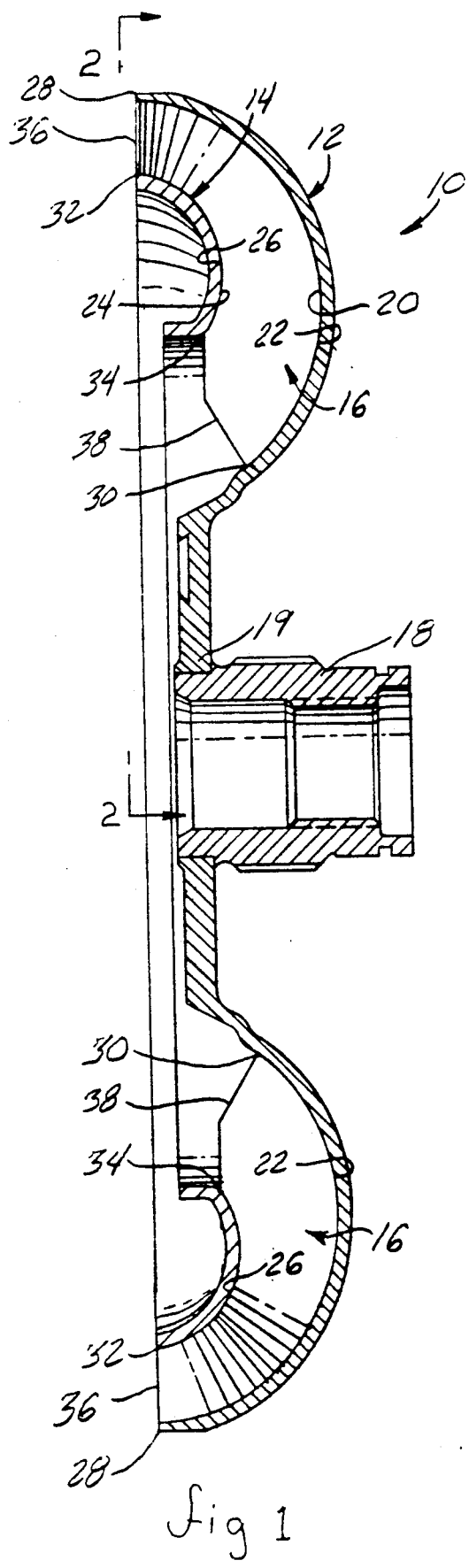
FIG. 1 is a sectional elevational view of a torque converter turbine incorporating the present invention.

Referring to the drawings, wherein like characters represent the same or corresponding parts throughout the several views, there is seen in FIG. 1 a torque converter turbine, generally designated 10, consisting of an integrally molded or cast structure having a semi-toroidal shell 12, a semi-toroidal core 14, a plurality of hydrofoil blades 16 and a drive hub 18 which is formed at the inner periphery 19 of the shell 12.

The shell 12 has a concave wall portion 20 and each blade 16 has a side surface 22 which is molded integrally with the wall 20. The core 14 has a convex wall 24 to which each blade 16 has a side surface 26 cast integrally therewith. The shell 12 has an outer circular periphery 28 and an inner circular periphery 30 and the core 14 has an outer circular periphery 32 and an inner circular periphery 34.

Each turbine blade 16 has a rounded leading edge or outer blade surface 36 and a rounded trailing edge or inner blade surface 38. As best seen in FIGS. 1 and 2, the leading edge 36 extends between the outer periphery 28 of the shell 12 and the outer periphery 32 of the core 14. The inner blade surface or trailing edge 38 extends between the inner periphery 30 of shell 12 and the inner periphery of the core 14.

In the preferred embodiment, the torque converter turbine has twenty-three blades which are equally spaced. The leading edge 36 of each blade 16 has a radius of curvature in the range of 1.50 to 2.50 mm and a radius of trailing edge 38 is in the range 0.40 to 0.60 mm. Thus, a smooth entrance and exit surface is provided for each blade 16.

Figure 3:
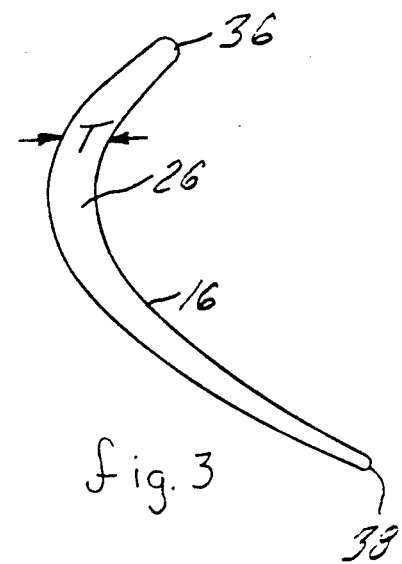
FIG. 3 is a plan view of the inner surface of a torque converter blade presented from the core side of the turbine.
Figure 4:
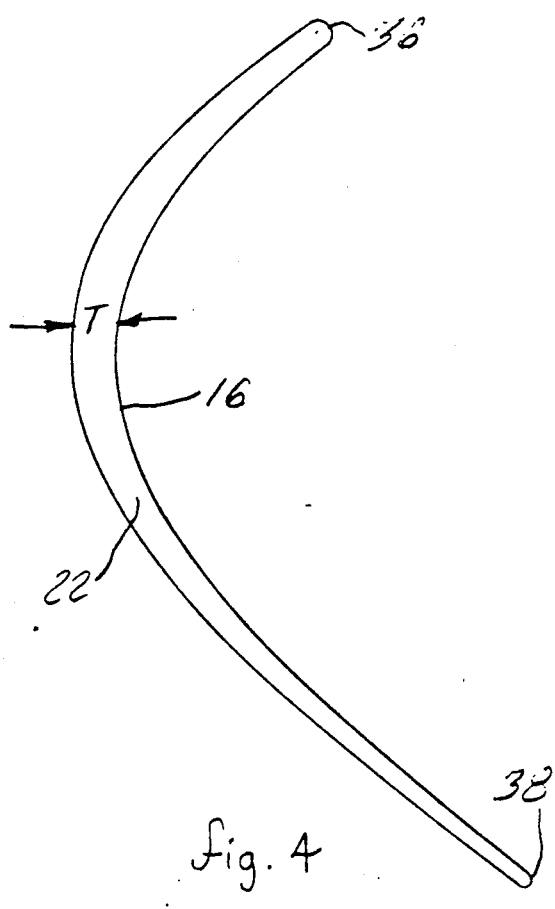
FIG. 4 is a view of a turbine blade as presented from the shell side of a turbine.

As best seen in FIGS. 2, 3 and 4, each turbine blade 16 increases in width as it extends away from the leading edge 36 to a maximum thickness T in the range of 4.00 to 10.00 mm. As best seen in FIG. 2, the adjacent blades 16 have an entrance area 40 and an exit area 42. Between the entrance and exit areas, each pair of adjacent blades 16 has a flow area extending between the entrance 40 and the exit 42. This optimum flow area distribution imposes minimum flow losses within the turbine. In a torque converter having a 245 mm outer diameter, the leading edge radius of curvature is preferably in the range of 1.50 to 2.00 mm, the maximum blade thickness is preferably in the range of 4.0 to 6.0 mm, and the trailing edge radius of curvature is preferably in the range of 0.4 to 0.5 mm.

The rounded leading edge 36 reduces the sensitivity of the torque converter turbine to the angle of incidence of the incoming or inlet fluid. As is well known, the angle of incidence varies over a wide range of values generally greater than 25 degrees. The rounded trailing edge 38 has less effect on fluid as it exits the turbine prior to entering the torque converter stator, not shown.

A torque converter utilizing a turbine constructed in accordance with the present invention has been tested in two passenger vehicles owned by the assignee and has shown an improvement of more than 0.5 mile per gallon in the vehicle fuel economy. The torque converter also exhibited an increase in torque converter efficiency in the range of 2-3%. One torque converter was coupled between an engine of approximately 3.8 liters and a 4-speed automatic transmission having an overdrive as top gear. The torque converter was designed to have a "K" factor of 122. This "K" factor is identical to the "K" factor of the bladed torque converter which was compared, during testing, with the torque converter utilizing the present invention. Another torque converter, with a "K" factor of 180, was coupled between a 2.8 liter engine and a 4-speed transmission exhibited similar improvement.

The present invention provides the same minimum flow area between adjacent blades as that of a comparable sheet metal turbine which results in the torque converter capacity remaining the same. The torque converter turbine of the present invention is less sensitive to the direction of fluid flow entering between the blades due to the radius of curvature of the leading edge. The pressure and velocity distributions are greatly improved in the fluid flow between adjacent blades when compared with known hydrofoil type blades. The fluid flow loss within the torque converter turbine is reduced because the number of blade passages is reduced as compared to prior art hydrofoil bladed elements. The present invention incorporates twenty-three blades wherein the conventional design would utilize at least twenty-five blades on each turbine.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A bladed element for a torque converter comprising: a shell having an outer periphery, an inner periphery and a concave wall joining the peripheries; a core having an outer periphery, an inner periphery and a convex wall joining the peripheries and facing said concave wall; a plurality of blades having a pair of side surfaces integral with respective ones of said concave and convex walls, each said blade including an outer blade surface extending between said outer peripheries and having a radius of curvature in the range of 1.50 to 2.50 mm, an inner blade surface extending between said shell and said core adjacent the inner peripheries thereof and having a radius of curvature in the range of 0.40 to 0.60 mm and a maximum central thickness in the range of 4.00 to 10.00 mm with said inner and outer blade surfaces blending smoothly thereto, said blades being shaped to provide an optimum flow area distribution between adjacent blades from the outer blade surfaces to the inner blade surfaces, and said shell, core and blade members being formed as a single molded element.

2. A bladed element for a torque converter comprising: a shell having an outer periphery, an inner periphery and a concave wall joining the peripheries; a core having an outer periphery, an inner periphery and a convex wall joining the peripheries and facing said concave wall; a plurality of blades molded integrally with and between said concave and convex walls, each said blade including an outer blade surface extending between said outer peripheries of said concave wall and said convex wall and having a radius of curvature in the range of 1.50 to 2.50 mm, an inner blade surface extending between said shell and said core adjacent the inner peripheries thereof and having a radius of curvature in the range of 0.40 to 0.60 mm and a maximum central thickness in the range of 4.00 to 7.00 mm with said inner and outer blade surfaces blending smoothly thereto, said blades being shaped to provide optimum flow area distribution between adjacent blades from the outer blade surfaces to the inner blade surfaces, and said shell, core and blade members being formed as a single molded element.

3. A bladed element for a torque converter comprising: a shell having an outer periphery, an inner periphery and a concave wall joining the peripheries; a core having an outer periphery, an inner periphery and a convex wall joining the peripheries and facing said concave wall; a plurality of blades having a pair of side surfaces integral with respective ones of said concave and convex walls, each said blade including an outer blade surface extending between said outer peripheries and having a radius of curvature in the range of 1.50 to 2.00 mm, an inner blade surface extending between said shell and said core adjacent the inner peripheries thereof and having a radius of curvature in the range of 0.40 to 0.50 mm and a maximum central thickness in the range of 4.00 to 6.0 mm with said inner and outer blade surfaces blending smoothly thereto, said blades being shaped to provide an optimum flow area distribution between adjacent blades from the outer blade surfaces to the inner blade surfaces, and said shell, core and blade members being formed as a single molded element.

* * * * *